United States Patent Office 3,544,328
Patented Dec. 1, 1970

3,544,328
PROCESS FOR CONCHING
Herbert N. Dunning and Robert D. Dannert, Minneapolis, Minn., assignors to General Mills, Inc., a corporation of Delaware
No Drawing. Filed Nov. 17, 1967, Ser. No. 683,820
Int. Cl. A23g 1/00
U.S. Cl. 99—23        4 Claims

ABSTRACT OF THE DISCLOSURE

Conched chocolate is produced by a method wherein a mixture consisting essentially of cocoa nibs and an edible solid material is ground in a jet mill at a temperature of 150 to 300° F.

---

The process of our invention is comprised of grinding of cacao nibs essentially by abrasion between the individual nibs. Further grinding is carried out by the grinding of the broken nib particles by abrasion between these particles. By grinding in this manner we can produce cacao particles which are smoothly ground and essentially spherical in shape. Since texture is a primary requisite, as evidenced by mouth feel of the chocolate, smooth particles tend to offer less frictional resistance upon mastication and as a result of their smoothness less cocoa butter is needed to produce a chocolate of a desirable texture.

One device which may be used for the grinding of cacao nibs by particle-particle abrasion is a fluid energy or jet mill. Essentially the jet mill is a hollow casing having adjustable fluid jets, a raw material inlet and an outlet for spent fluid and product. The finely ground product is carried out this latter outlet by the spent fluid after grinding. Grinding is accomplished in a jet mill by accelerating particles fed to it to relatively high velocities by the fluid present. While other grinding forces such as impact with the mill itself, shear, attrition, and compression provide some measure of grinding in a jet mill, these forces provide a relatively small amount of the total grinding when compared to the abrasion accomplished by particle-particle impact. The fluid used in a jet mill may be air, steam, air containing an excess of oxygen or mixtures of any of these.

When cacao nibs are ground in the jet mill care must be taken to keep the fat present from interfering with the grinding action on the rest of the nib. The fat tends to become liquified at normal grinding temperatures and if grinding alone is desired the jet mill should be kept at temperatures below that of the melting point of the fat present. We have found, also, that temperatures for grinding the nibs should not exceed 300° F. At temperatures greater than about 300° F. the chocolate evidences a "burnt" flavor.

The way to prevent cocoa fat from interfering with grinding by particle-particle abrasion is to keep grinding temperatures lower, about the temperatures required to melt cocoa fat. We have found this to be an excellent method for the production of bittersweet or bakers chocolate. We have also found, much to our surprise, that by the inclusion of materials which are solid at temperatures below about 300° at levels high enough to bind substantially all of the cocoa fat present in the jet mill and by grinding at conditions sufficient to volatilize the volatiles present in the cacao nib, we can produce a "conched" chocolate. Conching is normally a lengthy step used for the processing of a finished chocolate. It accomplishes an aeration function which encourages the evaporation of undesirable flavor components. It also oxidizes some of the tannins present to produce a milder flavor and it promotes a color deepening which is similar in nature to the Maillard reaction. Conching, however, may take days. Conching also requires expensive equipment and prevents processing of chocolate from becoming continuous. The jet mill grinding of chocolate at elevated temperatures in the presence of materials capable of binding substantially all of the fat produces a fully conched, highly desirable chocolate. The process time is short, the equipment involved is simple, easy to control and relatively inexpensive. The added solid material to be used may be any edible material preferably a material commonly found in a finished chocolate. Examples of these are sugar, salts, and nuts.

The grinding and conching may also be done in the presence of material which is not normally found in chocolate but which can be left in or easily removed from the raw mixture without leaving any undesirable characteristics in the finished product. The jet mill accomplishes a super aeration by the nature of its grinding operation. This super aeration is also present at reduced temperatures and tends to mellow out the raw flavors present in unconched, i.e., unprocessed chocolate. Added material can, of course, also be added to the low temperature grinding and this will serve to produce a more uniform homogeneous mixture. The particular choice of grinding process will naturally depend upon the chocolate desired. If an unconched chocolate is desired, grinding at lower temperatures is preferable. If a completely refined chocolate such as milk chocolate or sweet chocolate is the goal, then grinding at high temperatures in the presence of fat binding material is desired. For such products as semi sweet or dark chocolate, aliquots of cold ground and high temperature ground chocolate may be combined. The aeration accomplished in the cold grinding is sufficient to allow the aforementioned combination to be used to produce a palatable semi sweet or dark chocolate.

Another variation possible in the grinding of cacao nibs in a jet mill is the inclusion of a dutching agent such as ammonia in the jet mill at the time of grinding. This produces a dutched cacao nib. After pressing the fat from the cacao nib a dutched cocoa press cake results and the expressed cocoa fat is of prime quality. One of the problems in producing a dutched cocoa press cake has been the damage to the cocoa fat or cocoa butter by the dutching process. We have found that by dutching the nib in a jet mill we are able to produce prime quality cocoa butter and dutched cocoa press cake from the same nib.

Examples of our invention follow. All of the examples were done in a jet mill having a torus shaped chamber. The diameter of the grinding area was 6 inches. The diameter tapered to 4 inches where the spent fluid and product were discharged. The jet mill had two fluid pressure orifices. Pressure was measured at the mouth of the orifices and was kept at the same level for both inlets. The particular jet mill used has a jet inlet for product intake. The pressure for this intake is provided by a fluid carrier and is also measured at the jet. This measurement is not thought crucial because it merely introduces the material to be ground with grinding force supplied by fluid pressure.

Grinding is controlled in the jet mill by regulation of the choice of gas, the fluid pressure in the mill chamber, and the rate of product input. These factors are influenced by the cross sectional area of the grinding chamber and all of these variables are interrelated. For example, the higher the feed rate the more fluid pressure needed to produce the grinding desired. The limitations placed on feed rate include pressure, of course, determined by the capacity by the mill itself.

Examples I–VI are designed to show the effect of product temperature during grinding on flavor development. These examples each contained enough material which is solid during grinding to absorb substantially all of the fat which would be liquid to allow the higher grinding temperatures to be used. The ingredients used for this formulation are common to the production of milk chocolate. The first four ingredients were ground simultaneously in the jet mill.

| Ingredient: | Percent by weight of chocolate |
|---|---|
| Cacao nibs | 12.0 |
| Dried whole milk | 20.0 |
| Fine granulated sugar | 44.94 |
| Salt | 0.03 |
| Cocoa butter | 22.64 |
| Vanillin | 0.09 |
| Lecithin | 0.03 |

The conditions for grinding for Examples I–VI were as follows:

| Example No.: | Product feed rate lbs./hr. | Fluid pressure (p.s.i.g.) Fluid | Fluid pressure (p.s.i.g.) Product | Product temperature °F. (During grinding) |
|---|---|---|---|---|
| 1 | 300 | 80 | 50 | 50 |
| 2 | 260 | 80 | 50 | 100 |
| 3 | 265 | 80 | 50 | 150 |
| 4 | 260 | 80 | 50 | 200 |
| 5 | 275 | 80 | 50 | 250 |
| 6 | 260 | 80 | 50 | 300 |

The samples for each example were milled to produce a particle size from 20–25μ. They were mixed in a Z arm blender with cocoa butter, lecithin and vanillin for two hours. The samples were then tempered at 82–84° F. for about 10 minutes. Crystals then started to form. It was then reheated to 88–92° F. to melt the fat crystals and cooled in a 55° F. storage room to solidify the fat. The chocolate product was of the milk chocolate variety. (By this we mean chocolate containing milk solids.)

The milk chocolate was then sampled objectively. It was noted that all samples produced chocolate of an excellent brown color. Texture as measured by a uniform smooth feel was also adjudged excellent for all samples. The samples were then tasted. The sample adjudged best from a flavor standpoint was sample 4 (ground at 200° F.). At a temperature of 250° F. carmelization of the sugar was noticeable. In the 300° F. sample a mild burnt taste was noticed. The next best testing were the 150° F. and 250° F. samples. The sample run at 100° F. had a taste in between bakers chocolate and conched chocolate due to the smaller degree of removal of the undesirable flavor components. The bakers chocolate taste characteristics were accentuated in the 50° F. sample.

EXAMPLES VII–XI

These examples are designed to show the effect of fat levels on grinding. For these examples product feed rate was 285 lb./hr., product temperature was 200° F., fluid pressure for product intake was 50 p.s.i.g. and 80 p.s.i.g. for air intake.

Examples VII and VIII are milk chocolate formulations, the added solid material being sugar. The ingredients used for these examples were as follows:

| | Percent by weight | |
|---|---|---|
| | Example VII | Example VIII |
| Ingredients: | | |
| Nibs | 20 | 25.0 |
| Fine granulated sugar | 60 | 56.3 |
| Dried whole milk | 20 | 18.7 |
| Cocoa fat (in nibs) | 10.6 | 13.25 |
| Total fat | 16.2 | 18.5 |

The product of Example VII was a thoroughly ground blended mixture. The product of Example VIII did not grind as well. All of the liquid fat present did not seem to adsorb on the surfaces of the sugar in Example VIII.

Examples IX and X show the use of the jet mill in the manufacture of a sweet chocolate formulation. The formulas for these examples were:

| | Percent by weight | |
|---|---|---|
| | Example IX | Example X |
| Ingredients: | | |
| Nibs | 20 | 25 |
| Fine granulated sugar | 80 | 75 |
| Fat total | 10.6 | 13.25 |

The results upon grinding these samples were nearly identical with the results of grinding milk chocolate. It is thought that while grinding in the presence of dried whole milk as in Examples VII and VIII adds fat to the material to be ground, the solids, not fat, in dried whole milk are present at a level of about 2½ times that of fat. It is believed that the solids not fat, i.e. milk protein, lactose, etc., either partially or wholly bind the fat in the dried whole milk.

It should be noted that undesirable volatiles in unrefined chocolate having boiling points ranging from acetic acid at 245.5° F. to acetaldehyde at 68° F. It is believed that as a result of the super aeration present in our system the tannins are rapidly oxidized and some volatiles are removed at temperatures below their boiling point.

Therefore it is not the amount of fat which is critical but the ratio of the material which will be solid at elevated grinding temperatures to the amount of liquifiable material present in the grinding mixture and the liquid binding abilities of the above mentioned solid material. The effect of the fat adsorptive qualities of a highly fat adsorbent solid material is indicated by Example XI. This example shows grinding at a higher fat level than is the case when sugar was added.

EXAMPLE XI

The composition of the material to be ground is as follows:

| Ingredients: | Percent by weight |
|---|---|
| Nibs | 30 |
| Finely divided, puffed rice | 70 |
| Fat total | 15.9 |

The ground product was comparable to the ground products of Examples VIII and X.

The following table gives a comparison of the solids to fat ratio of the grinding mix used in the following examples. It will be noted that the solid to fat ratio in the milk chocolate preparation is the the lowest. This is believed to be because the solids not fat, i.e. casein, albumen and lactose are also fat binding agents.

TABLE I

| Product: | Solids:fat |
|---|---|
| (Milk) chocolate (20% nibs) | 4.65:1 |
| (Milk) chocolate (25% nibs) | 3.75:1 |
| (Sweet) chocolate (20% nibs) | 7.54:1 |
| (Sweet) chocolate (25% nibs) | 5.65:1 |
| Chocolate with rice flour (30% nibs) | 4.4:1 |

When the ratio of solids to fat of the nibs-rice flour mixture is compared with the nibs-sugar mixture having nearly identical grinding characteristics it is found that less rice flour than sugar is needed to adsorb equivalent amounts of fat.

EXAMPLE XII

The previous examples are designed for the manufacture of a completely conched chocolate. Example XII is an example of the manufacture of a chocolate which is not conched i.e. bittersweet or bakers chocolate. Since volatiles are present to a large extent in unconched chocolate, it is unnecessary to operate at high temperatures. The mill was cooled (by liquid nitrogen here) so that the product temperature was kept below the melting point of the fat and a mixture of 30% sugar and 70% nibs was the blend used for bakers chocolate. Because the fat is solid here little or no added material is needed but since sugar is normally present in bittersweet chocolate it is conveniently added at the grinding stage. Grinding conditions for duplicate lots were as follows.

| Fluid pressure | | Product temperature of— | Feed rate, lbs./hr. |
|---|---|---|---|
| Fluid | Product | | |
| 70 | 40 | −5 | 110 |
| 70 | 40 | 11 | 210 |

Both of these lots after melting and tempering produced excellent and nearly identical bittersweet chocolate.

As has been demonstrated above the solids to fat ratio varies with the solid material used. For example, the milk used in our examples was spray dried; other drying processes for the milk may affect the milk protein differently and the milk fat may be encapsulated by the milk solids or adsorbed on the surface. These factors will obviously affect the amount of added fat taken up by the milk solids. If materials other than sugar or milk solids are used the solids to fat ratio will change. Conditions of jet milling will also affect the solid to fat ratio which may be tolerated. For example, if all of the fat present is not melted at the grinding temperature sufficient to perform conching then a lower solid to fat ratio will be needed.

Dark chocolate and semi sweet chocolate may be made by combining aliquots in the desired proportions of a jet milled bittersweet and a jet milled sweet chocolate.

EXAMPLE XIII

This example shows the treatment of cacao nibs in a jet mill with anhydrous ammonia. Two lots were run in a cooled jet mill, one lot being treated with ammonia during grinding and the other lot untreated.

| Sample | Fluid Pressure | | Product temperature (during grinding) | Feed rate, lbs./hr. |
|---|---|---|---|---|
| | Fluid | Product | | |
| Control | 80 | 50 | 0° F. | 120 |
| NH₃ added | 80 | 50 | 0° F. | 120 |

The ground nibs were discharged from the grinding operation as a powder. Heating of the powder produced a chocolate liquor from which the cocoa butter was then expressed hydraulically.

The cocoa powder samples were analyzed subjectively. The ammonia treated sample was reddish brown in color compared to the brownish color of the untreated sample. There was no evidence of an ammonia odor when the dutched sample was mixed with hot milk. Suspendability of both the control and the dutched sample was superior to conventional cocoa.

Analytical data on the liquor, cocoa butter and cocoa powder, was taken at various stages of the operation with the following results.

TABLE II

| Sample | Liquor | | Free fatty acid (as oleic) | Cocoa Powder | |
|---|---|---|---|---|---|
| | pH | Fat | | pH | Fat |
| Control | 5.77 | 52.3 | 0.93% | 5.56 | 12.125 |
| Ammonia added | 7.72 | 52.3 | 0.76% | 6.27 | 12.10 |

Free fatty acid is considered to be a measure of equality of cocoa butter. It is generally believed that if the free fatty acid content of the cocoa butter is greater than 1%, the cocoa butter will not be of prime quality.

Variants on processing conditions and formulations will readily suggest themselves to those skilled in the art. Therefore we do not intend specific conditions, solids to fat ratios or non chocolate ingredients to be limited to those listed above.

Having fully and completely disclosed the process of our invention, we claim:

1. A method for conching chocolate comprising finely grinding a chocolate mixture consisting essentially of cocao nibs and an edible solid material in a jet mill at a temperature of between about 150 and 300° F., said edible solid material remaining essentially solid during the grinding operation and being present in an amount sufficient to substantially bind all of the fat which is liquified during the grinding operation.

2. The method of claim 1 wherein the edible solid material is sugar.

3. The method of claim 1 wherein the edible solid material is a mixture of sugar and dried whole milk.

4. The method of claim 1 wherein the temperature is between about 150 and 250° F.

References Cited

UNITED STATES PATENTS

| 1,167,956 | 1/1916 | Walker | 99—26 |
| 1,243,244 | 10/1917 | Bladen | 99—26 |
| 2,212,544 | 8/1940 | Lund | 99—23 |
| 2,356,181 | 8/1944 | Rubens | 99—23 |
| 2,889,225 | 6/1959 | Polik | 99—23 |

OTHER REFERENCES

Jensen H. R.: The Chemistry Flavouring and Manufacture of Chocolate Confectionery and Cocoa. J. & A. Churchill, London 1931 (pp. 102–104).

LIONEL M. SHAPIRO, Primary Examiner

D. M. NAFF, Assistant Examiner